United States Patent

Koechner

[11] 4,357,704
[45] Nov. 2, 1982

[54] DISC OR SLAB LASER APPARATUS EMPLOYING COMPOUND PARABOLIC CONCENTRATOR

[75] Inventor: Walter Koechner, Great Falls, Va.

[73] Assignee: Science Applications, Inc., La Jolla, Calif.

[21] Appl. No.: 187,326

[22] Filed: Sep. 15, 1980

[51] Int. Cl.³ .............................................. H01S 3/093
[52] U.S. Cl. ...................................... 372/72; 372/71; 372/75
[58] Field of Search ...................... 331/94.5 C, 94.5 D, 331/94.5 P; 350/293, 294; 372/67, 70, 72

[56] References Cited

U.S. PATENT DOCUMENTS

| | | | |
|---|---|---|---|
| 3,423,696 | 1/1969 | Chernoch | 331/94.5 P |
| 3,504,295 | 3/1970 | Chernoch | 372/67 |
| 3,683,296 | 8/1972 | Scalise | 331/94.5 P |
| 4,119,928 | 10/1978 | Michon et al. | 372/67 |

Primary Examiner—William L. Sikes
Attorney, Agent, or Firm—Bruno J. Verbeck; Michael L. Slonecker; Joseph C. Schwalbach

[57] ABSTRACT

An improved laser apparatus is provided wherein a laser and a pump source comprising an array of GaAs or GaAlAs light emitting laser diodes or of excimer fluorescors or lasers which emits a large cross section beam of generally collimated pumping radiation are coupled by flux concentrating means comprising a compound parabolic concentrator.

19 Claims, 2 Drawing Figures

DISC OR SLAB LASER APPARATUS EMPLOYING COMPOUND PARABOLIC CONCENTRATOR

BACKGROUND OF THE INVENTION

This invention relates to improvements in laser apparatus. Lasers are devices which generate or amplify, and emit coherent electromagnetic radiation at higher frequencies than microwave frequencies, usually in the infrared and visible portions of the electromagnetic spectrum called optical radiation. The light emission from a laser is characterized by a narrow wavelength spread, i.e., it is essentially monochromatic, and by its spatial or in-phase relationship. Lasers may be fabricated from any active medium in which a population inversion may be established by suitable pumping. Typical of active laser media are neodymium glass, ruby, carbon dioxide, and helium-neon mixtures.

While the laser may take a variety of forms, the present invention is concerned with disc or slab type lasers which are characterized by having a thickness dimension along a line normal to the major faces thereof which is small as compared to the transverse dimension across the faces thereof.

Emission of coherent radiation from a laser requires population inversion, the condition which exists when a substantial number of the possible atomic or molecular radiating species in the active laser material are raised to a metastable energy state above the ground state of the species. When this condition exists, an incident photon of laser emission wavelength may stimulate a radiative transition from a metastable level to a lower level, which may or may not be the ground state of the species. Such radiative transitions are cumulative and self stimulating, resulting in the emission of radiation which is coherent and in-phase. Population inversion is achieved, for example, by irradiation of the laser medium with a high intensity of electromagnetic radiation at a wavelength of appropriate energy to raise the radiating specie to a metastable state when the radiation is absorbed thereby. Such inversion-causing radiation is referred to as pumping radiation, and the wavelength of the pumping of activating radiation is known as the pumping wavelength.

The activation or creation of a population inversion, essential for coherent electromagnetic radiation, is achieved by optical pumping, namely the irradiation of the active medium with optical radiation from a source usually referred to as a pump. The amount of inversion created within an active laser medium is a function of the flux density (energy per unit area) of the pumping optical radiation incident thereupon. It is therefore desirable that means be provided for maximizing the amount of pumping radiation from the pump which may be incident upon an active surface of the laser.

Neodymium doped glass (Nd:glass) has found frequent application in laser developments, and the pumping means conventionally used in such developments have been flashlamps. A flashlamp represents a long and narrow cylindrical radiation source which radiates into $4\pi$ sterad, and reflector designs have been developed which provide optimum coupling of this pump source to disc or slab lasers.

Flashlamp pumped Nd:glass discs or slab lasers are not suitable for certain applications, for example as drivers in inertial confinement fusion systems, because of low conversion efficiency and limited repetition rate capability. Both limitations arise because of a very poor match between emission of flashlamp and absorption of Nd:glass and the low thermal conductivity of glass.

To avoid these problems, advanced developments in the solid state fusion driver art employ as sources of pumping radiation arrays or panels of light emitting diodes or excimer fluorescors or lasers. These devices provide a higher pump efficiency and reduce the amount of heat deposited in the glass laser slab or disc. Pumps of this type emit a generally collimated large cross section beam normal to a usually plane emitting surface, in contrast to the $4\pi$ sterad radiation from long and narrow cylindrical light sources provided by flashlamps. However, the reflector designs which provide optimum coupling between flashlamps and lasers are optimized for the cylindrical, incoherent emitter, and are either unusable or strongly inadequate for use with the panel type pump sources.

SUMMARY OF THE INVENTION

With the foregoing in mind it is a general object of the present invention to provide an improved laser apparatus wherein a disc or slab type laser and a pump adapted to provide a large cross section beam of generally collimated pumping radiation are coupled with maximum flux concentration allowed by phase space conservation.

Another object of the invention is to provide an improved laser apparatus of the class described wherein the coupling of the pump and laser and the flux concentration is provided by a compound parabolic concentrator.

A further object of the invention is to provide an improved laser apparatus of the type mentioned in which the compound parabolic concentrator may be either troughlike, conelike, pyramidal or the like in configuration.

A more specific object of the invention is to provide a laser apparatus of the class described in one form of which the laser is face pumped, and in another form of which the laser is edge pumped.

Another object of the invention is to provide an improved laser apparatus of the class described which is adaptable for use in either an oscillator or an amplifier configuration.

Other and further objects and advantages of the invention will become apparent as the description proceeds.

DETAILED DESCRIPTION OF THE PREFERRED EMBODIMENT

Figure 1:
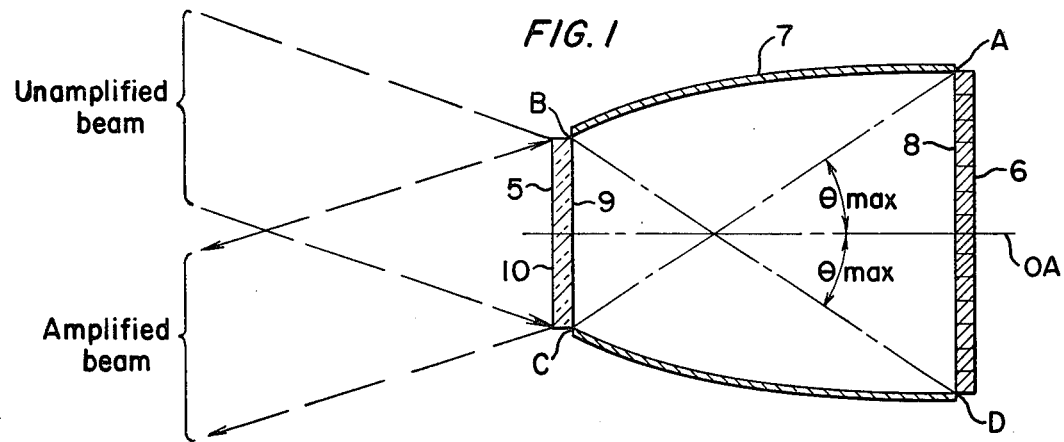
FIG. 1 is a semidiagrammatic sectional view of one form of laser apparatus constructed in accordance with the invention.

Referring more particularly to FIG. 1 of the drawing, there is illustrated therein a disc or slab type laser medium body 5, a pump source 6, and a concentrator 7 coupling the source 6 to the laser medium body 5. Source 6 preferably takes the form of a panel comprising an array of light emitting laser diodes or excimer fluorescors or lasers. The source 6 is provided with an inner surface 8 and is adapted to emit from said surface a substantially collimated beam of radiation of relatively large cross section, which beam is directed generally toward the laser medium body 5 and normal to the surface 8, the latter being preferably planar.

The concentrator 7 is of the compound parabolic type described in *Solar Energy*, 1974, Vol. 16, pg. 89, Roland Winston. Both the troughlike and conelike geometries of concentrators described therein can usefully be embodied in the present invention. The compound parabolic concentrator 7 provides optimum coupling of the source 6 to laser medium body 5 by virtue of the fact that it provides the maximum concentration of the pumping radiation flux permitted by phase space conservation.

The compound parabolic concentrator is a nonimaging light funnel that derives its characteristic optical properties from the specific shape of the external wall, which is made specularly reflecting. In FIG. 1 the parabola BA has its focus at C and its axis (which passes through C) parallel to the line BD. It has a focal length equal to BC/2 (1+sin $\theta$). Parabola CD is the same, except that its focus is at B and its axis is parallel to the line CA. Such devices achieve the following concentration ratios (X) of entrance area/exit area:

$$X_{trough} = n/\sin \theta_{max}$$

$$X_{cone} = n^2/\sin^2 \theta_{max}$$

Where $\theta$ is the angular acceptance (half-angle) and n is the index of refraction of the collector relative to the surrounding medium. This concentration is the maximum permissible by physical principles.

The laser medium body 5 is preferably formed of commercially available neodymium doped glass, for example 4% neodymium doped glass available from American Optical Company of Pittsburgh, PA as AOLux No. 1689. As shown in FIG. 1 the body 5 is of the face pumped type, the right hand face 9 thereof being coated with dielectric which is totally reflective at laser energy wavelength and highly transmissive at optical radiation wavelengths. The edge surface of the body 5 is preferably coated with dielectric which is highly absorptive at laser energy wavelength to prevent internal reflections from said surface. The body 5 also has its left hand face 10 coated with dielectric which is partially transmissive at laser radiation wavelengths, uncoated, or antireflection coated. In any of these three cases the laser medium body 5 may be employed in laser oscillator configuration.

When used in a laser oscillator apparatus, the pumped surface 9 of the laser medium body 5 may define one end of an optical resonant cavity. The single end surface pumped, single end surface laser beam emitting disc or laser medium body 5 may also be utilized in a two-pass laser amplifier configuration wherein, as shown by the broken arrows in FIG. 1, an unamplified beam is incident upon the surface 10 at an angle relative to the normal thereof and is emitted therefrom in amplified form at the conjugate angle. The laser amplifier may include a plurality of serially optically coupled active mirrors or modules of the type shown in FIG. 1 whereby the laser beam emitted therefrom has an extremely high energy, especially in pulse mode operation of the laser medium bodies.

Many applications require laser energy outputs which are higher than that obtained from a laser oscillator alone, and for such cases a laser power amplifier is optically coupled to the output of the oscillator. A laser amplifier in accordance with the invention, as illustrated in FIG. 1, is similar in construction to the laser oscillator in that a body of laser material is optically pumped, the primary distinction being that in the amplifier an unamplified laser beam generated by a laser oscillator is incident upon the face 10 of the laser medium body 5, and upon a double pass through the laser material (i.e. reflection from the totally reflective coating on surface 9) an amplified laser beam is emitted through the face 10. Since the amplifier is of the nonresonant type, the face 10 is either uncoated, or preferably is antireflection coated.

The large area of the faces 9 and 10 of the disc or slab shaped laser medium body 5, in addition to providing an efficient pumping geometry, permits the generation of high output of laser energy while maintaining the energy density within the laser material below the level destructive of the laser material. The combination of a laser medium body 5, optical pumping panel or array 6 (and power supply therefor), and compound parabolic concentrator 7 forms what may be defined as a laser module. Laser modules can be combined in multi-stage systems such as high energy laser oscillators and power amplifiers. Depending upon the application, the laser medium body 5 may be disc shaped, i.e. with surfaces 9 and 10 circular, in which case the concentrator 7 is preferably conelike in shape. Alternatively the laser medium body 5 may be rectangular in shape, i.e. slab shaped in which case the concentrator 7 may be troughlike in configuration with flat end walls, or it may take the form of a truncated pyramid having parabolic sidewalls.

As used herein, a conelike compound parabolic concentrator is one having the shape of a truncated cone which is symmetric with respect to and spaced from its optic axis and which, in diametric cross section, exhibits on each side thereof a profile curve in the shape of a parabola whose focus is at the opposite edge of the exit aperture, and whose axis is inclined at the angle $\theta_{max}$ (see FIGS. 1 and 2) with respect to said optic axis. As used herein, a troughlike compound parabolic concentrator is one having the shape of a trough defined by opposite sidewalls which are bilaterally symmetrically spaced with respect to an optic axis plane. In cross section transverse to said plane the troughlike concentrator exhibits, on each side thereof, the same profile curve exhibited by the conelike concentrator in diametric cross section, i.e. the focus is at the lower edge of the opposite sidewall and the axis is inclined at the angle $\theta_{max}$ with respect to said optic axis plane.

Figure 2:
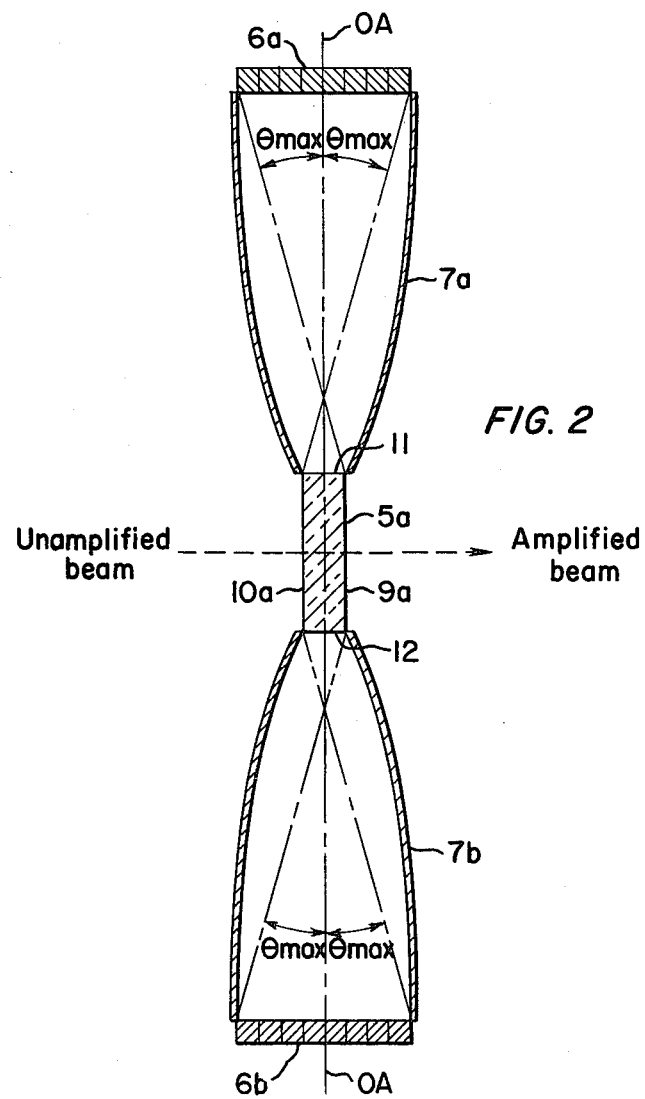
FIG. 2 is a semidiagrammatic sectional view of a modified form of laser apparatus constructed in accordance with the invention.

FIG. 2 illustrates a form of the invention in which a slab or disc type laser medium body 5a is edge pumped, rather than face pumped, there being one or more pump sources such as the panels 6a and 6b coupled to the edge portions of the body 5a by compound parabolic concentrators 7a and 7b.

In one form of the invention shown in FIG. 2, the laser medium body 5a has planar rectangular faces 9a and 10a and planar rectangular edge surfaces 11 and 12, in which case the concentrators 7a and 7b may be troughlike in shape with flat end walls, or they may be in the shape of truncated pyramids having parabolic walls. If desired, a pair of pump panels and concentrators similar to those shown in FIG. 2 may be associated with the rectangular planar edge surfaces of the laser medium body 5a (not shown) which are normal to the surfaces 11 and 12. Alternatively, the body 5a may be in disc form, having circular faces 9a and 10a and a cylindrical edge face, in which case the concentrator may form part of a toroid having annular parabolic sidewalls which extend between the cylindrical edge face and the panel pump source, which source may take the form of a cylindrical annular array of light emitting diodes or excimer fluorescors or lasers.

When the form of the invention shown in FIG. 2 is employed in laser medium body oscillator configuration, the surface 10a of laser 5a is coated with dielectric which is totally reflective at laser energy wavelength, whereas surface 9a is coated with dielectric which is partially transmissive at laser radiation wavelengths, said coatings providing the opposite ends of an optical resonant cavity, with laser radiation being emitted from the surface 9a in the direction of the arrow shown. On the other hand, when the apparatus shown in FIG. 2 is employed as a laser amplifier, an unamplified laser beam generated by a laser oscillator is incident upon the face 10a of disc 5a, and upon passage through the laser material, an amplified laser beam is emitted through the face 9a. Since the amplifier is of the nonresonant type, the face 10a is either uncoated or preferably is antireflection coated.

While several embodiments of the invention have been shown and described, it will be apparent the many modification and changes therein may be made without departing from the spirit of the invention. All of such changes are contemplated as may come within the scope of the appended claims.

What is claimed as the invention is:

1. In combination, a laser medium body having a pair of similar generally parallel opposite planar major faces and having a thickness dimension between said faces which is small as compared to a transverse dimension of said faces, said body also having a pumping surface portion; a laser pump panel having a surface portion from which it is adapted to emit a relatively large cross section beam of generally collimated laser pumping radiation; and flux concentrating coupling means for said pump and laser medium body, said means comprising a compound parabolic concentrator having an inlet end opening across which said surface portion of the pump panel extends for direction of pumping radiation thereinto, and having an outlet end opening of reduced area across which the pumping surface portion of said laser medium body extends for receipt of concentrated radiation from said pump panel.

2. The combination of claim 1 wherein said pump comprises an array of light emitting diodes.

3. The combination of claim 1 wherein said pump comprises an array of excimer lasers.

4. The combination of claim 1 wherein said pump comprises an array of GaAs or GaAlAs light emitting diodes.

5. The combination of claim 1 wherein said pumping surface portion is an edge surface portion of said laser medium body.

6. The combination of claim 1 wherein said pumping surface portion is a face surface portion of said laser medium body.

7. The combination of claim 1 wherein said pumping surface portion is a face surface portion of said laser medium body and is overlaid by a mirror transmissive of optical pumping radiation wavelengths and reflective of laser energy radiation wavelengths.

8. The combination of claim 1 which includes at least one additional pump panel and wherein said laser medium body has at least one additional pumping surface portion, each of said at least one additional pump panels being coupled to a separate one of said at least one additional pumping surface portions by a compound parabolic concentrator.

9. The combination of claim 1 which includes at least one additional pump panel and wherein said pumping surface portion is an edge surface portion of said laser medium body, said laser medium body has at least one additional pumping surface portion which is an edge surface portion thereof, and each of said at least one additional pumping panels is coupled to a separate one of said at least one additional edge surface portions by a compound parabolic concentrator.

10. The combination of claim 1 wherein said laser medium body has a generally cylindrical edge pumping surface portion, said pump panel is generally of annular cylindrical configuration and coaxially surrounds said body, and said pump panel is coupled to said cylindrical edge pumping surface portion by an annular compound parabolic concentrator forming with said panel and surface portion a generally toroidal configuration.

11. The combination of claim 1 wherein the pumping surface portion of said laser medium body is overlaid with a coating which is reflective at laser energy wavelengths and transmissive at optical radiation wavelengths.

12. The combination of claim 1 wherein one of said major faces is overlaid with a coating which is reflective at laser energy wavelengths, said laser medium body being adapted to permit passage therethrough of a laser beam incident upon the other of said major faces, such beam being reflected by said reflective coating back through said body and being emitted in amplified form from said other major surface.

13. The combination of claim 1 wherein both major faces of said laser medium body are transmissive at laser energy wavelengths, said laser medium body being adapted to permit passage therethrough between said major faces of a laser beam incident upon one of said faces, whereby said beam is amplified during such passage and is emitted from the opposite face of said body.

14. The combination of claim 1 wherein said concentrator comprises opposing parabolic sidewalls bilaterally symmetrically spaced from an optic axis plane.

15. The combination of claim 1 wherein said concentrator has a sidewall which is generally circular in cross section in planes normal to an optic axis, and in a plane including said optic axis exhibits in cross section opposing parabolic wall portions which are bilaterally symmetrically spaced from said axis.

16. The combination of claim 1 wherein said pumping surface portion is a planar edge surface portion of said laser medium body, and said concentrator comprises opposing parabolic sidewalls bilaterally symmetrically spaced from an optic axis plane.

17. The combination of claim 1 wherein said pumping surface portion is a face surface portion of said laser medium body, and said concentrator has a sidewall which is generally circular in cross section in planes normal to an optic axis, and in a plane including said optic axis exhibits in cross section opposing parabolic wall portions which are bilaterally symmetrically spaced from said axis.

18. The combination of claim 1 wherein said pumping surface portion is a planar face surface portion of said laser medium body, and said concentrator comprises opposing parabolic sidewalls bilaterally symmetrically spaced from an optic axis plane.

19. The combination of claim 1 which includes an additional pump panel and wherein said pumping surface portion is a planar edge surface portion of said laser medium body, said laser medium body has an additional planar edge surface portion, and said additional pump panel is coupled to said additional edge surface portion by an additional compound parabolic concentrator, each of said concentrators comprising opposing parabolic sidewalls bilaterally symmetrically spaced from an optic axis plane.

* * * * *